United States Patent
Dawson

(10) Patent No.: US 11,124,173 B2
(45) Date of Patent: Sep. 21, 2021

(54) METHOD AND APPARATUS FOR OUTPUTTING A CONTROL SIGNAL

(71) Applicant: JAGUAR LAND ROVER LIMITED, Coventry (GB)

(72) Inventor: Mark Dawson, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 16/038,113

(22) Filed: Jul. 17, 2018

(65) Prior Publication Data
US 2020/0023831 A1  Jan. 23, 2020

(51) Int. Cl.
| | |
|---|---|
| *B60W 10/30* | (2006.01) |
| *B60W 40/02* | (2006.01) |
| *G06K 9/00* | (2006.01) |
| *G06T 7/13* | (2017.01) |
| *G01N 21/53* | (2006.01) |

(52) U.S. Cl.
CPC ............ *B60W 10/30* (2013.01); *B60W 40/02* (2013.01); *G01N 21/538* (2013.01); *G06K 9/00791* (2013.01); *G06T 7/13* (2017.01); *B60W 2420/42* (2013.01); *B60W 2555/20* (2020.02); *G06T 2207/30252* (2013.01)

(58) Field of Classification Search
CPC .. G06T 7/13; G06T 5/009; G06T 7/73; G06T 2207/30242; G06T 3/40; G06T 7/11; G06T 7/136; G06T 7/174; G06T 7/90
See application file for complete search history.

(56) References Cited

U.S. PATENT DOCUMENTS

| | | | |
|---|---|---|---|
| 10,071,676 B2* | 9/2018 | Schofield | G06K 9/209 |
| 2008/0169912 A1* | 7/2008 | Kawasaki | G06K 9/00805 340/425.5 |
| 2016/0055384 A1* | 2/2016 | Yoo | G06K 9/6201 701/41 |
| 2019/0164293 A1* | 5/2019 | Ellison | G06T 7/11 |

FOREIGN PATENT DOCUMENTS

CN    109584176 A   *   4/2019

OTHER PUBLICATIONS

Search and Examination Report, GB1711591.6, dated Jan. 10, 2018, 5 pages.

* cited by examiner

*Primary Examiner* — Tuan C To
*Assistant Examiner* — Paul A Castro
(74) *Attorney, Agent, or Firm* — McCoy Russell LLP

(57) ABSTRACT

A method for outputting a control signal can include receiving image data associated with an image captured by an image capture means, determining a visibility condition about a vehicle by analysing at least a portion of the image data to determine one or more edges in the image, and outputting a control signal based on the analysis, the control signal for controlling an operation of a vehicle system of the vehicle. The method may be used to detect the presence of a foggy environment whereby the presence of fog reduces the number of detectable edges in an image.

18 Claims, 14 Drawing Sheets

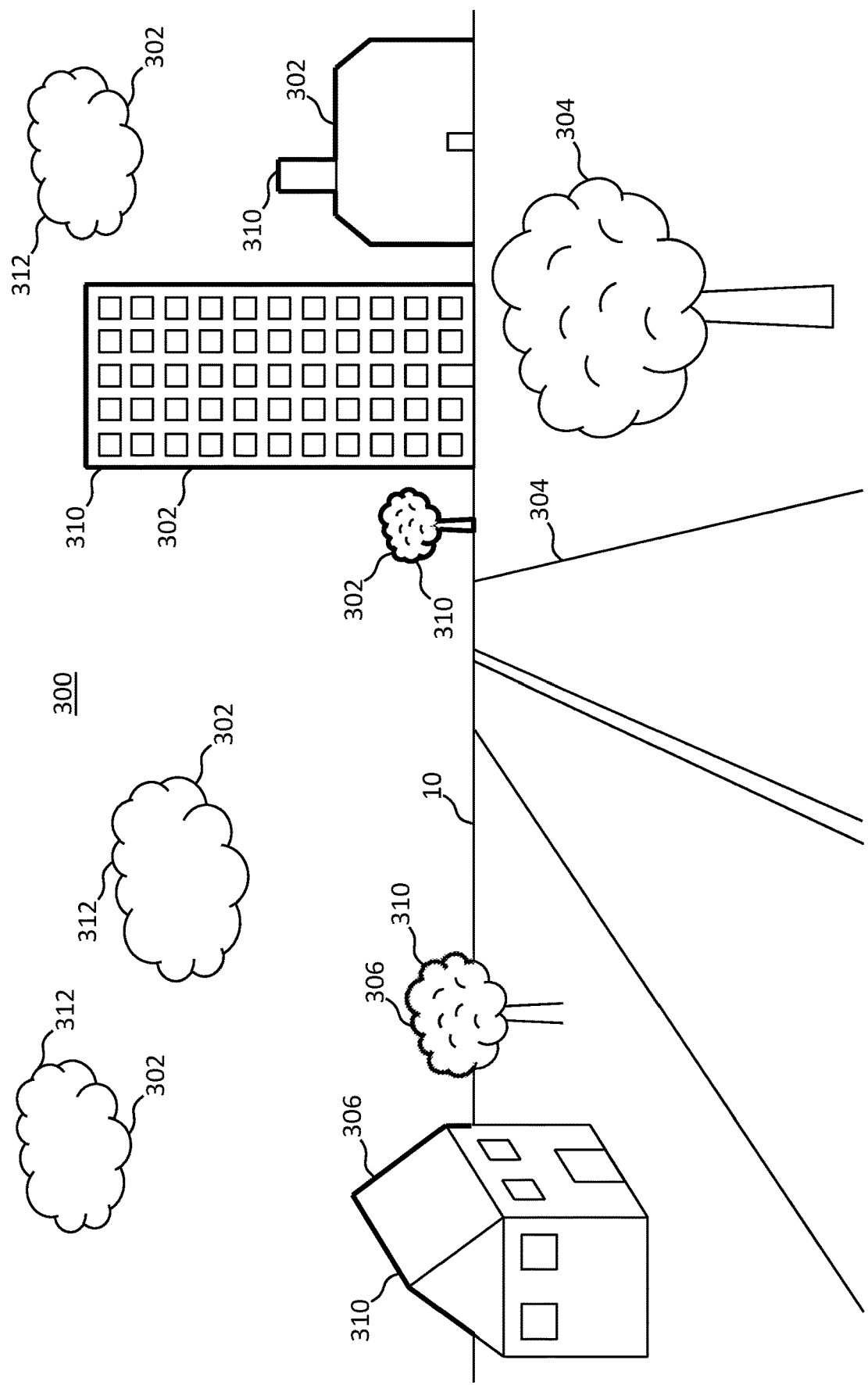

METHOD AND APPARATUS FOR OUTPUTTING A CONTROL SIGNAL

CROSS REFERENCE TO RELATED APPLICATION

This application claims priority to and the benefit of GB1711591.6 filed on Jul. 19, 2017, which is incorporated herein by reference in its entirety.

TECHNICAL FIELD

The present disclosure relates to a method and apparatus for outputting a control signal and particularly, but not exclusively, to a method and apparatus for outputting a control signal for controlling an operation of a vehicle. Aspects of the invention relate to an image analyser for outputting a control signal, to a vehicle comprising an image analyser for outputting a control signal and to a method for outputting a control signal.

BACKGROUND

When a vehicle, such as a car, motorbike, van or lorry is being driven, it is usual to adjust particular operational parameters or functions of the vehicle in response to identifying an external environmental state. This could be, for example, a driver turning the car head lights on when it gets dark. Another example could be a car using a light sensor system to automatically detect a low light level and turn on the headlights without the driver's input. Similarly, a driver of a car may know they are driving through a particularly polluted area with a lot of smog and may wish to manually close the car air vents. The driver may get this information, for example, from a weather report broadcast over the car radio.

Automatic head light activation using light sensors does not work well in daylight foggy or 'smoggy' conditions because the ambient level of light in the local external environment may be bright enough not to trigger the light sensor. If the vehicle's driver forgets to turn on the fog lights then this places the driver and other road users in danger.

Furthermore, in foggy conditions, a driver may not know whether the fog has been polluted to the point where it has become smog. Even if the driver remembers to turn on the fog lights, he or she may not realise that polluted air is coming through the air vents into the vehicle. Even if the driver finds out, for example through radio weather broadcasts, that the outside environment is polluted and manually shuts the vents, the polluted air has already entered the cabin and may be circulated around using the inbuilt ventilation system. Letting in polluted air into a cabin is a health hazard, particularly to those with respiratory medical conditions.

The present invention has been devised to mitigate or overcome at least some of the above-mentioned problems.

SUMMARY OF THE INVENTION

According to a first aspect of the present invention there is provided a method for outputting a control signal; the method comprising: receiving image data associated with an image captured by an image capture means; determining a visibility condition about a vehicle by analysing at least a portion of the image data to determine one or more edges in the image; outputting a control signal in dependence on the analysis; the control signal for controlling an operation of a vehicle system of the vehicle.

The presence of fog or smog in an image scene may lead to a reduction in the number of edges visible in an image scene captured by the image capture device. The method therefore provides for the ability to control a vehicle operation as a result of a foggy environment, such as, but not limited to, shutting an air vent or turning on a fog light.

The method may comprise selecting a portion of the image data for the analysis, the selected portion associated with a portion of the image.

The method may be configured such that selecting the portion of the image data comprises: selecting a region having at least one lateral border running across and within the image.

Selecting a portion of the image allows the method to remove some image features close to the vehicle. These features may give rise to detected edges irrespective of fog. Discounting these close features aids the method to focus on objects/features in the distance where fog or smog would affect the presence of edges.

The method may be configured such that: the image comprises a horizon; and, the selected portion is selected from the region of the image above the horizon.

The method may be configured such that the selected portion is determined from any one or more of: A) location data associated with the vehicle; B) a signal from an accelerometer accommodated about the vehicle.

The method may be configured such that: the analysing comprises summing the number of determined edges; and, outputting the control signal is in dependence on the summed number of edges.

A typical image may normally comprise a number of separable edges representing outlines of different objects or object features in the distance. Fog may reduce the total number of these edges visible in the image; therefore basing the control signal on the total number of these edges provides a way of determining the possible presence of fog.

The method may be configured such that analysing the image data comprises applying an edge detection algorithm to the image data.

The method may comprise: determining a variance of pixel intensity value for a plurality of pixels for at least a portion of the image data; and wherein the control signal is output in dependence on the determined variance.

It has been found, by the inventor/s, that high pollution levels decreases the variance in the image. Therefore by monitoring the variance the image analyser and method described herein can provide another means to determine a foggy image that may be used in conjunction with the detection of edges.

The method may be configured such that the portion of the image data for determining the variance of the pixel intensity values for the plurality of pixels is the portion of the image data analysed to determine the one or more edges.

The method may comprise: analysing a colour value of a plurality of pixels in at least a portion of the image data; and, outputting the control signal in dependence on the colour value analysis.

If a car is being driven in an environment, like the desert, where there are no objects nearby or on the horizon and there are no clouds in the sky, then the edge detection algorithm may detect very few or no edges. This in turn may nominally lead to a control signal to be output such as turning the fog lights on. This may be undesirable in such circumstances because the visibility is clear. The method may therefore determine whether there are a suitable number of coloured pixels within the image data. If a number of image pixels in the image are determined to be of a particular colour, this would indicate that the lack of edges is simply due to a clear but featureless environment.

The method may be configured such that analysing the colour value of the pixels in the plurality of pixels comprises: determining the number of pixels having a colour value within a colour value range; AND, comparing the determined number of pixels to a threshold.

The method may be configured such that the colour value range corresponds with pixels having a blue hue.

The method may be configured to output the control signal based on data associated with the location of the vehicle The method may be configured such that: the control signal is configured to control the operation of one or more of: a vehicle lighting system; an infotainment system; and, a vehicle ventilation system.

The method may comprise any one or more of: shutting the vehicle vent upon the output of the control signal; activating the vehicle light.

The method may comprise receiving image data representative of an image in front of the vehicle.

The image data may comprise moving image data.

The method may be configured such that: outputting the control signal comprises any one or more of: A) determining whether to output the control signal; B) determining the type of control signal to be output.

The method may comprise: receiving, a signal associated with environmental data; and outputting the control signal in dependence on the environmental data.

In certain situations, foggy environments may be different due to the presence or lack of pollution. If environmental data indicated polluted fog then as well as turning on a fog light, the method may also require the closing of an air vent to minimise the amount of pollution entering the vehicle.

The method may be configured such that the environmental data is associated with a plurality of environmental conditions; and, the method comprises outputting the control signal in dependence on at least two of the environmental conditions.

The environmental conditions may comprise temperature and humidity. If an environmental condition indicates pollution, the control signal may be configured to close an opening of a vehicle ventilation system.

There is also presented a non-transitory computer readable medium comprising program code, which when executed by a processing means is configured to cause the processing means to give effect to the method as described in the above first aspect.

According to a second aspect of the present invention there is provided an image analyser for outputting a control signal, the processing means configured to: receive image data associated with an image captured by an image capture means; determine a visibility condition about a vehicle by analysing at least a portion of the image data to determine one or more edges in the image; output a control signal in dependence on the analysis; the control signal for controlling an operation of a vehicle system of the vehicle.

The image analyser may be configured to: select a portion of the image data for the analysis, the selected portion associated with a portion of the image.

The image analyser may be configured such that selecting the portion of the image data comprises: selecting a region having at least one lateral border running across and within the image.

The image analyser may be configured such that analysing the image data comprises applying an edge detection algorithm to the image data.

The image analyser may be configured to: determine the variance of pixel intensity value for a plurality of pixels for at least a portion of the image data; and wherein the control signal is output in dependence on the determined variance.

The image analyser may be configured to: analyse the colour value of a plurality of pixels in at least a portion of the image data; output the control signal in dependence on the colour value analysis.

The image analyser may be configured such that the control signal is configured to control the operation of one or more of: a vehicle lighting system; an infotainment system; and, a vehicle ventilation system.

There is also presented a vehicle comprising an image analyser as described in the second aspect.

There is also presented a system comprising the image analyser and the image capture means, then a vehicle comprising the system.

There is also presented a vehicle as described above and further comprising an image capture means.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 2c shows the image scene of FIG. 2b with the edges highlighted;

DETAILED DESCRIPTION

Figure 1A:
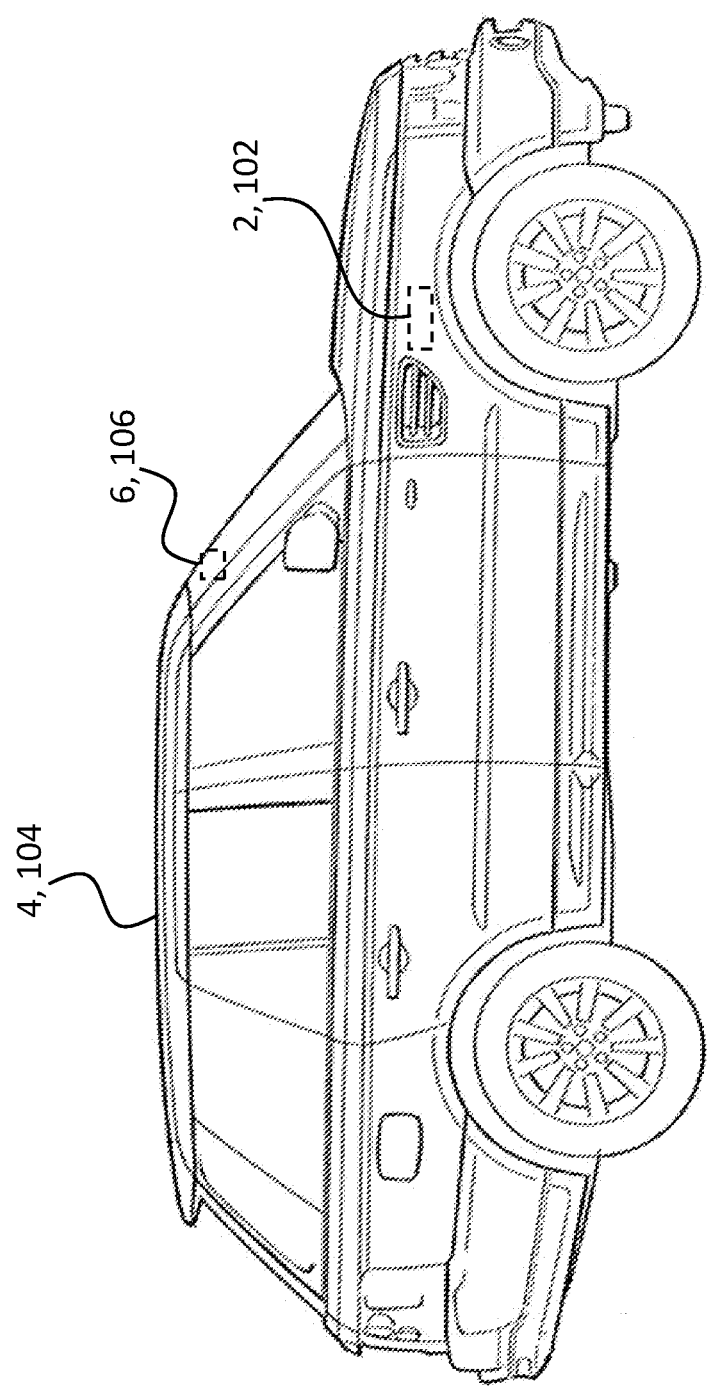
FIG. 1a shows a vehicle comprising an image analyser and an image capture means according to an embodiment.

There is presented an image analyser 2 for outputting a control signal. An example of a vehicle 4 having the image analyser 2 is shown in FIG. 1a. The image analyser 2 is configured to receive image data associated with an image captured by an image capture means 6. The 'image' may also be referred an 'image scene' herein. The image analyser 2 is also configured to analyse at least a portion of the image data to determine one or more edges in the image scene, and output a control signal based on the analysis. The control signal is for controlling an operation of the vehicle 4.

In the example shown in FIG. 1a, the vehicle 4 is a car 104 having the image analyser 2 located and secured within the car 104. The example of FIG. 1a shows the image capture means 6 also being contained within the car 104. In this example the image capture means 6 is a camera 106 located upon the front windscreen, however other positions of camera are also possible. The camera 106 is set up to face substantially in the forward direction of vehicle travel, i.e. recording one or more images takes from image scenes in front of the car's bonnet.

Figure 1B:
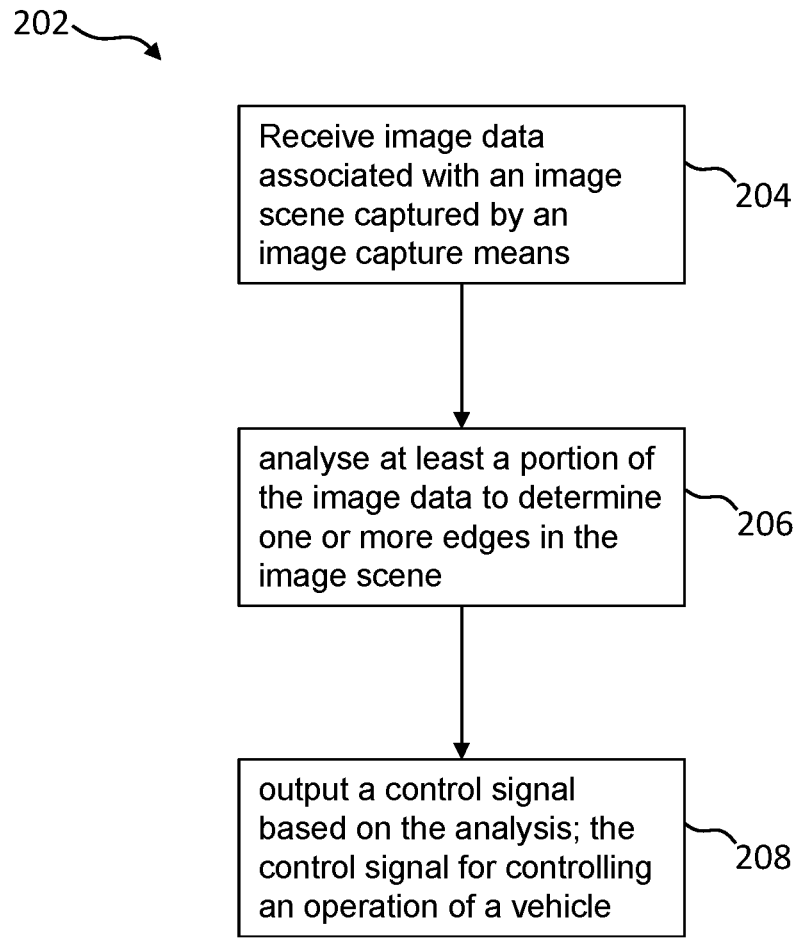
FIG. 1b shows a method for outputting a control signal according to an embodiment.

Accordingly there is also presented a method 202 for outputting a control signal. An example of the method 202 is shown in FIG. 1b. The method receives 204 image data associated with an image scene captured by an image capture means. The method analyses 206 at least a portion of the image data to determine one or more edges in the image scene and then outputs 208 a control signal based on the analysis. The control signal is for controlling an operation of a vehicle 4. The method may use a image analyser 2 to perform at least one of the aforementioned steps. The image analyser may be used to perform all of the aforementioned steps and optional other steps as described elsewhere herein.

In addition, or in the alternative, to a control signal being output for controlling an operation of a vehicle 4, the signal output as a result of the determination of the one or more edges may be a signal for a purpose other than controlling an operation of a vehicle 4. For example a signal to provide a visual or audio indication to the driver to manually perform a certain action, such as turn the vehicle fog lights on.

In the example of FIG. 1a, the vehicle 4 is a car 104, however the image analyser 4 may be located within, affixed to or otherwise accommodated by any suitable vehicle 4, including a land vehicle, watercraft or aircraft. The vehicle 4 may be a transport vehicle for transporting people and/or cargo. The vehicle 4 may be any of a wheeled, tracked, railed or skied vehicle. The vehicle 4 may be a motor vehicle including but not limited to, a car 104, lorry, a motorbike, a van, a bus, a coach.

The image analyser 2 may be an electronic image analyser such as, but not limited to an electronic control unit or other embedded system that controls one or more of the electrical systems or subsystems in the vehicle. The image analyser 2 in the example shown in FIG. 1a is a computer 102 housed within the vehicle 4. This computer 102 may be the same as or different to the computer system that controls an operation of the vehicle 4. This operation may be any suitable operation or function whereby the control signal actuates any one or more of, but not limited to: a mechanical and/or electrical action such as shutting a vent or applying an electronic speed limit; an optical response such as turning on a headlight or turning of a headlight; another response such as sending a communication upon output of the control signal.

The computer 102 may form part of the engine management system although the image analyser 2 may be any other image analyser 2 described elsewhere herein. In another example the image analyser 2 could be a portable device, such as a smart phone or tablet that can establish a data communications link with the vehicle's computer. The same portable device may comprise the image capture means 6.

The image capture means 6 in the example shown in FIG. 1a is a front facing camera installed about the vehicle 4. This may be a camera installed inside or outside the vehicle 4. In this example the camera records a digital image in the visible spectrum although other wavelength regions may be used. The image capture means 6 may be any other image capture means 6 described herein.

The following is a description of an example operation of the image analyser 6 in the vehicle 4 shown in FIG. 1a. When a driver is driving the vehicle 4, the camera 106 repeatedly records digital images as the car 104 is moving forwards along the road. The images may be single discrete images takes at particular time intervals or they may be images that are taken as part of moving image data such as an MPEG file. The image data is sent from the camera 106 to the computer 102. This may be done wirelessly or over a wired data communication medium. The image data may be sent using electronic or optical transmissions.

The computer 102 analyses the digital image data to determine one or more edges in the image scene. This may be done using an edge detection algorithm, such as but not limited to a Sobel algorithm. Other edge detection algorithms may also be used, including any of the edge detection algorithms described herein.

The computer 102 then determines a number of edges from the edge detection analysis and compares this number to a threshold value. If the threshold value is not exceeded then the computer 102 outputs a control signal for controlling an operation of the car 104. In this example the computer 102 is looking to determine whether the outside environment is foggy. If such an environment exists then it is more likely that objects captured by the camera are obscured or otherwise not visible. This in turn means that the edges of the objects in the image scene may not have been captured by the image or the contrast of the edges is low. When performing the edge detection on the 'foggy' image, the computer determines very few or no edges. This signifies a foggy or smoggy environment. Upon this determination and threshold comparison, the computer may send a control signal to turn the fog lights on and/or shut the vents to prevent polluted air entering the vehicle.

The image analyser and method described herein may include other processes to determine whether a control signal should be output and/or what control signal is output. The processes may be embodied in one or more software modules stored on memory means.

In some examples, the image analyser 2 may select a portion of the image for analysis. In a low visibility environment objects that are close to the vehicle 4 may be less likely obscured. Low visibility environments may include environments, outside of the vehicle, having conditions such as: being foggy, smoggy, having smoke or mist, rain or snow, or an environment with an excess of air particulates. In the present disclosure, reference may be made to fog or smog environments providing low visibility, however it is understood that such low visibility environments may be brought about by other effects as discussed above. In such environment, such as foggy/smoggy environment, objects that are close to the vehicle 4 may be less likely obscured by fog/smog, to the extent that an edge detection algorithm will still detect the edges of such objects in a foggy environment. The image analyser may determine a number of visibility conditions from the edge detection, including, but not limited to, low or high visibilities or other conditions such as conditions defined by a % value, such as 50% visibility.

One way of reducing the likelihood of detecting edges of these nearby objects is to select a portion of the image where objects are more likely to be further away from the vehicle 4. This portion may be, for example, a portion of the image above the horizon. Selecting the region in the image scene may comprise selecting a region having at least one border running substantially horizontally across and within the image scene.

In one example, the image analyser 2 selects a rectangular portion of the image scene above the horizon. In some examples, the rectangular portion is a pre-defined area, for example the top half of the image. Other image portions may be selected. These portions may be pre-selected such that the image analyser selects the same portion of each subsequent image captured by the camera as the vehicle is being driven; in other words, the same pixel area.

Figure 2A:
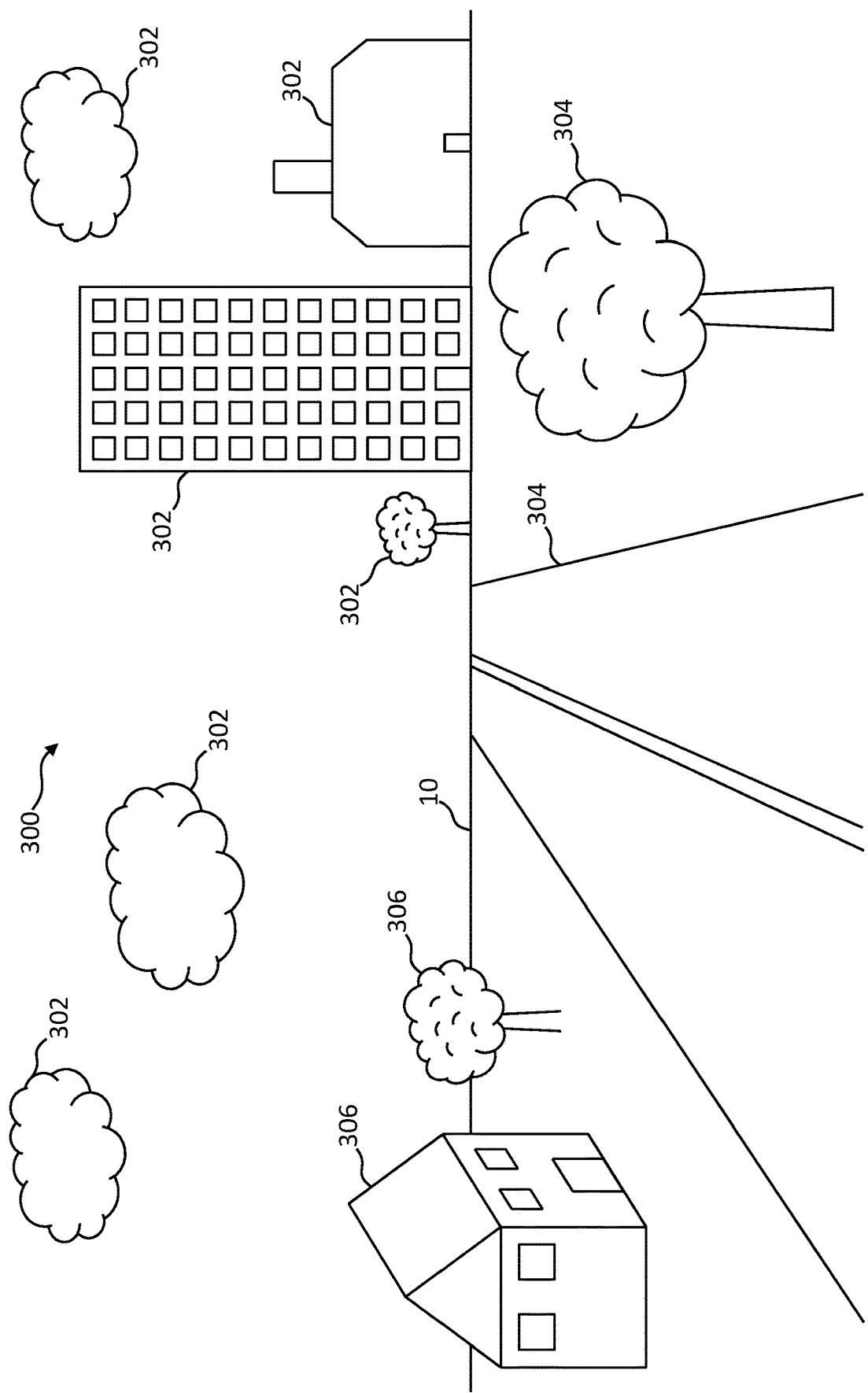
FIG. 2a shows an image scene captured by an image capture means according to one embodiment.
Figure 2B:
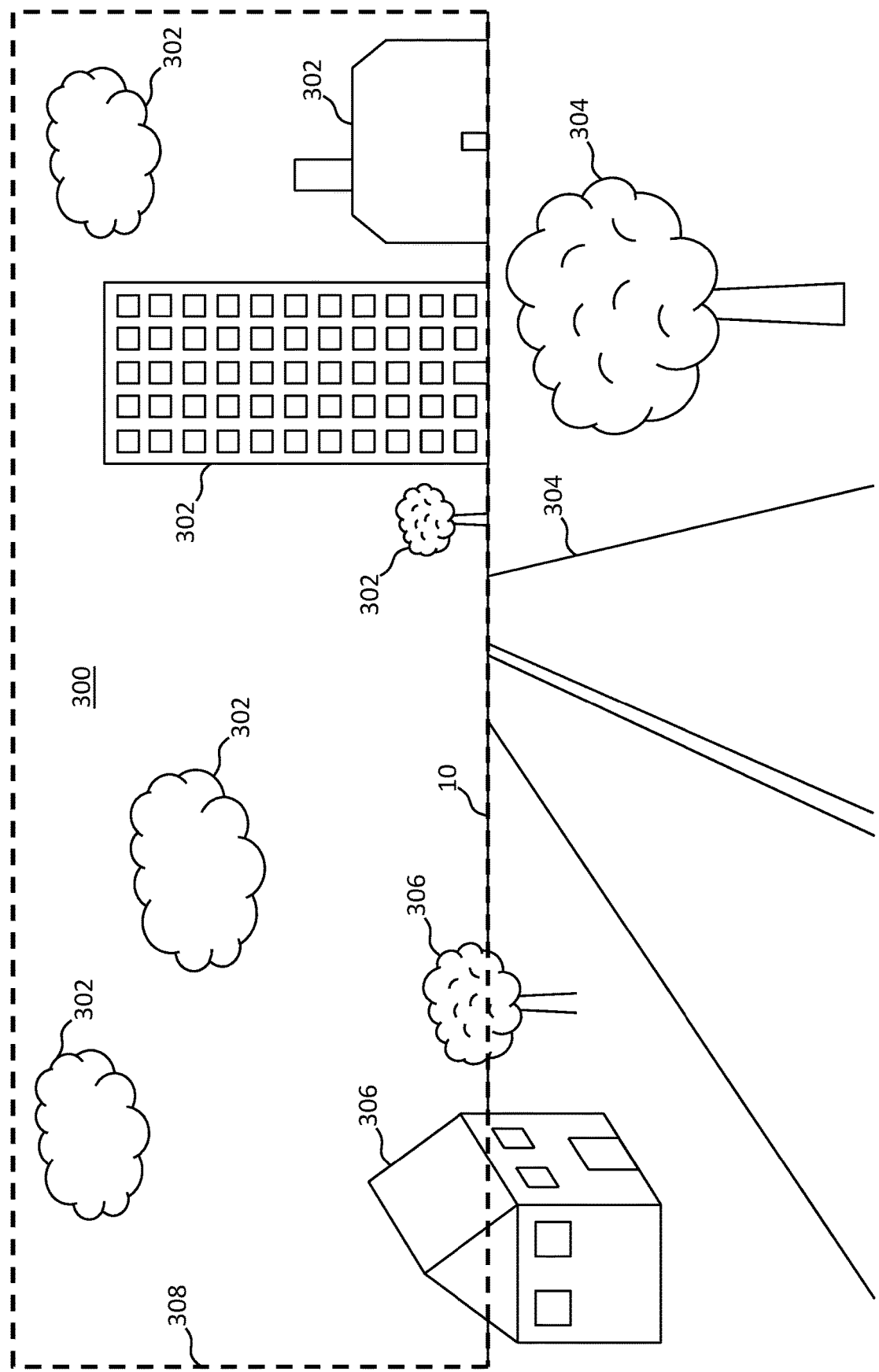
FIG. 2b shows the image scene of FIG. 2a with a selection box superimposed.

FIG. 2a shows an example of an image scene 300 captured by the camera 106 when no fog or smog is in the local environment. The image 300 shows a horizon 10 and multiple objects in the scene; some objects 302 above the horizon 10, some objects 304 below the horizon and some objects 306 having portions above and below the horizon 10. FIG. 2b shows the same image scene 300 with a dashed selection box 308 superimposed. The selection box selects the portions of each of the objects 302, 304, 306 above the horizon 10. This box in this example is a rectangle having: a bottom lateral border extending within the image and across the entire width of the image; a top lateral border opposite the bottom lateral border running coincident with and along the top edge of the image; two opposing side edges connecting the top and bottom lateral edges. The bottom lateral edge extends substantially horizontally across the image scene. Other selection boxes may also be used including, for example any one or more of, but not limited to: boxes where the bottom lateral edge does not extend all the way across the image scene; boxes where the top lateral edge also extends within the image instead of being coincident with the peripheral edge.

Figure 2D:
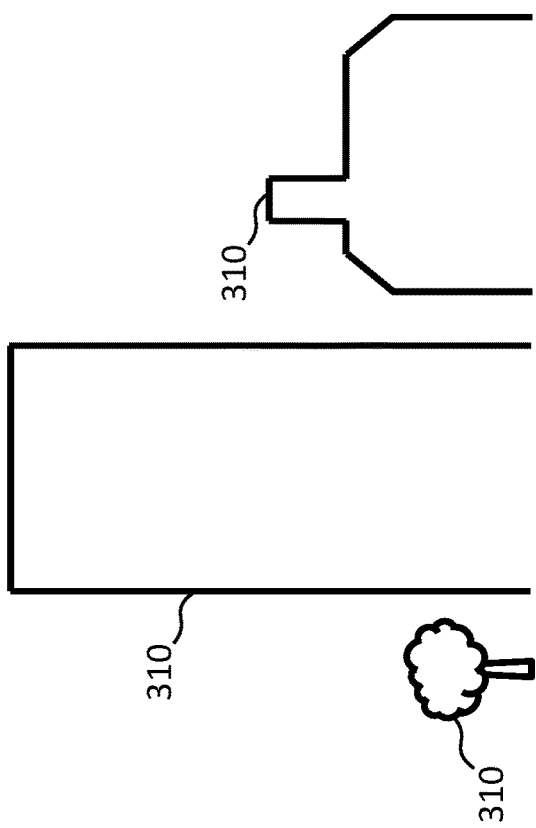
FIG. 2d shows the highlighted edges highlighted of FIG. 2c.
Figure 2D:

FIG. 2c shows the same image scene 300 wherein an edge detection algorithm has been applied to the portion of the image within the selection box 308. The edges output by the algorithm are shown in thicker lines 310. FIG. 2d shows the image scene 300 with just the detected edges and without the objects 302, 304, 306. In this example the objects 312 above the horizon 10 were not detected by the edge detection algorithm. This is because the objects were clouds that had a low and graded contrast with the rest of the sky within the image scene, which entailed that the edge detection algorithm did not detect them. Even without detecting the clouds 312, the image analyser 2 still detected five continuous edge elements in the scene 300.

Figure 3A:
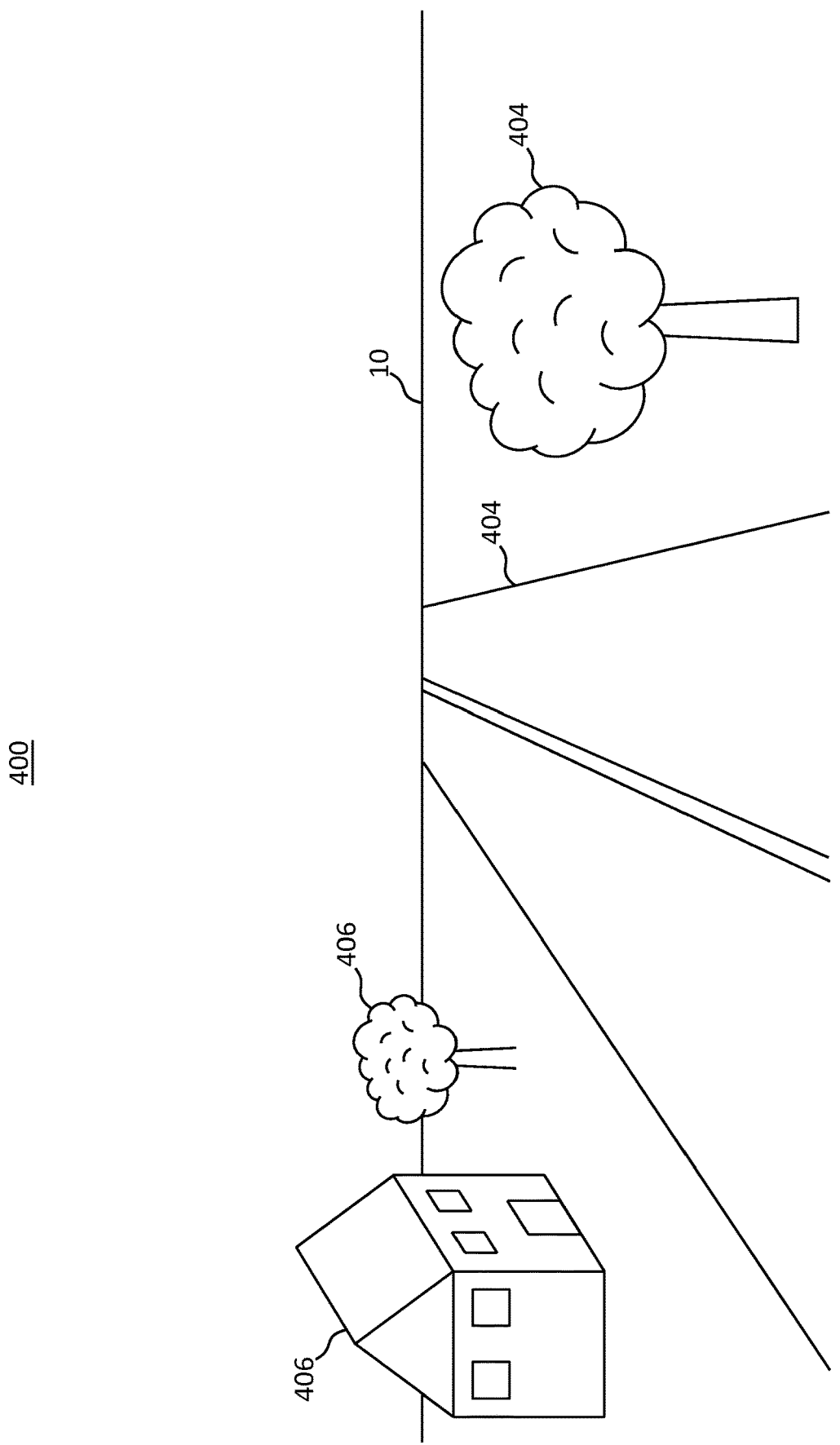
FIG. 3a shows an image scene captured by an image capture means according to another embodiment where the environment is foggy.
Figure 3B:
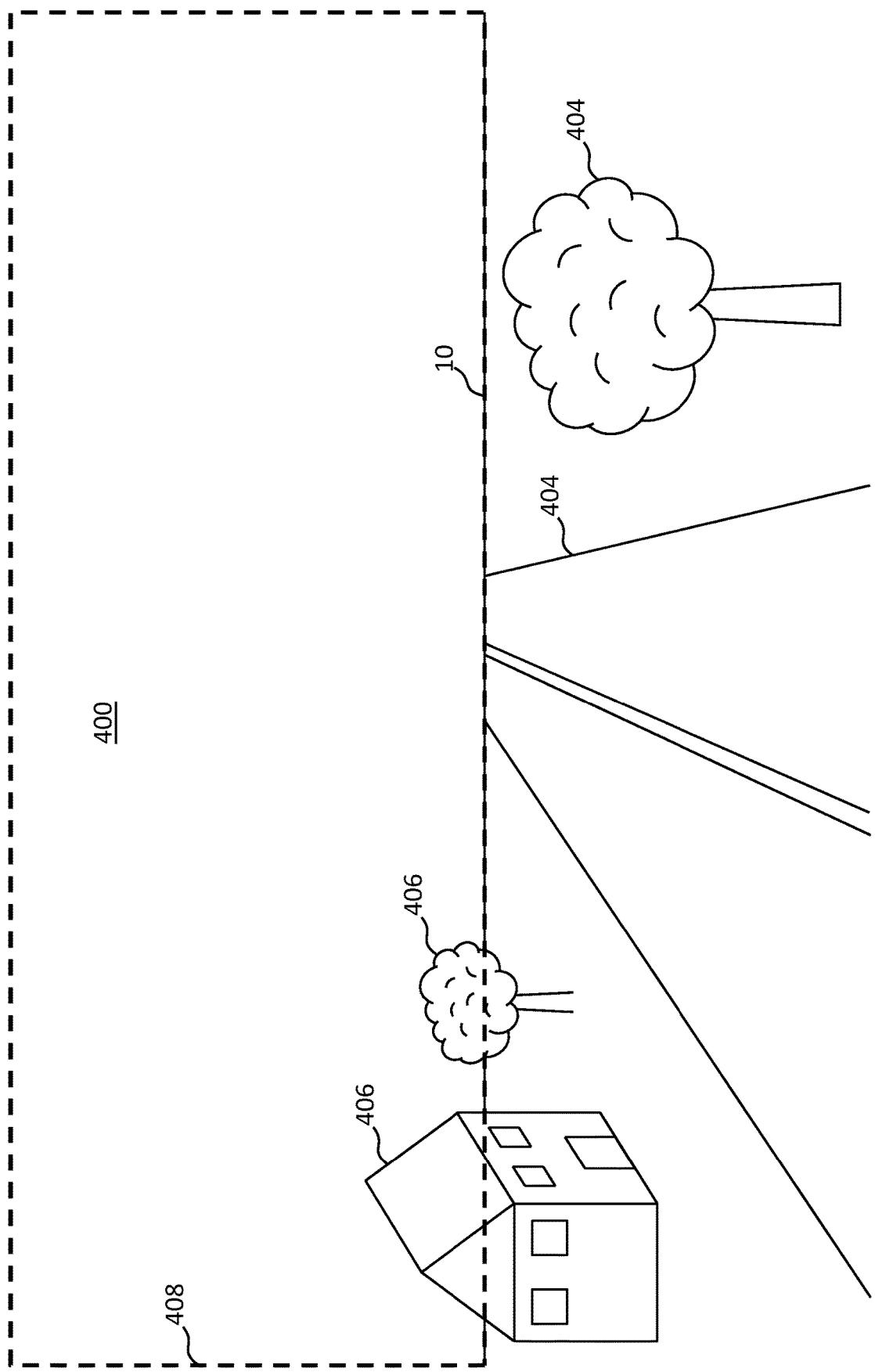
FIG. 3b shows the image scene of FIG. 3a with a selection box superimposed.
Figure 3C:
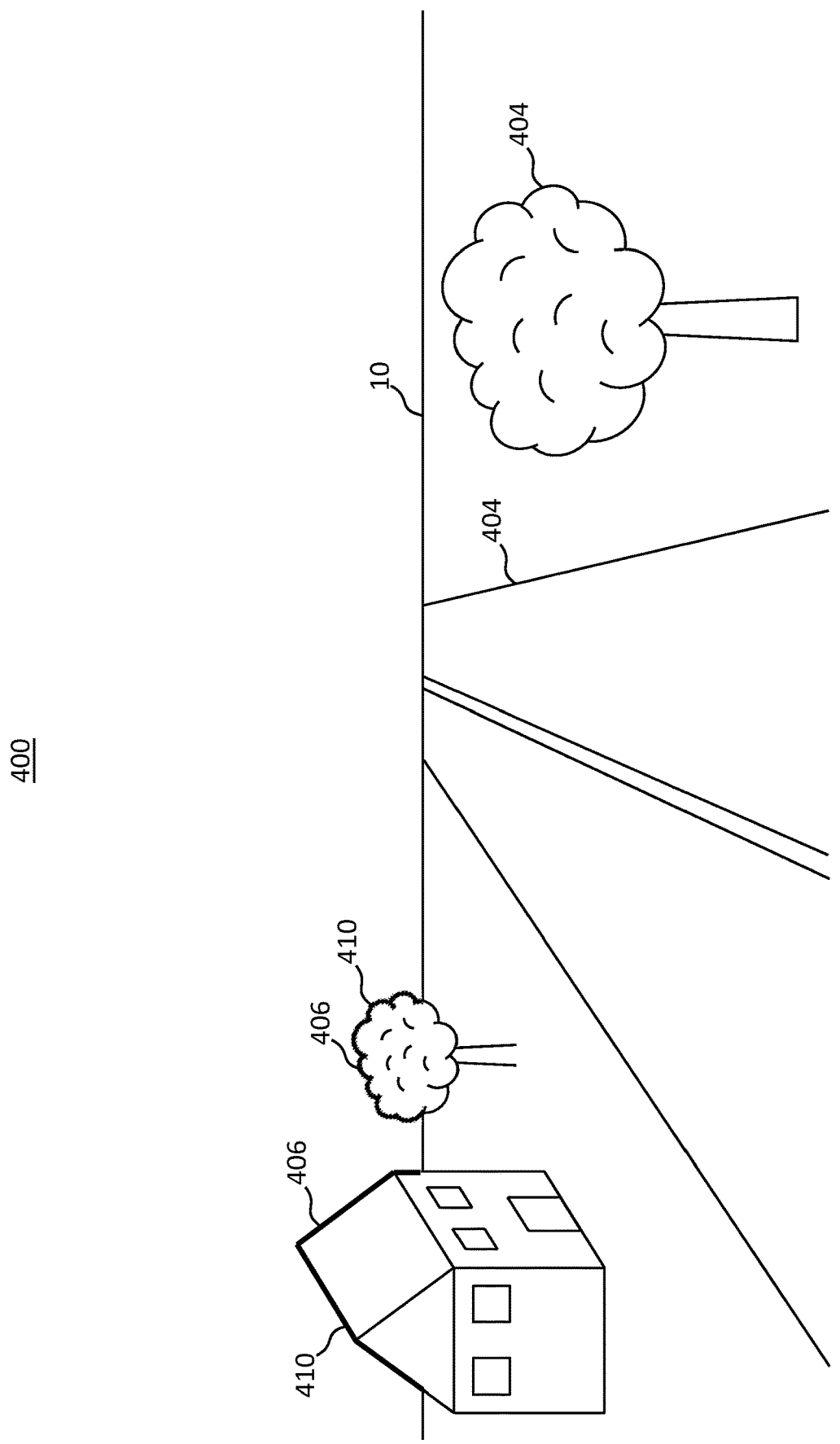
FIG. 3c shows the image scene of FIG. 3b with the edges highlighted.
Figure 3D:
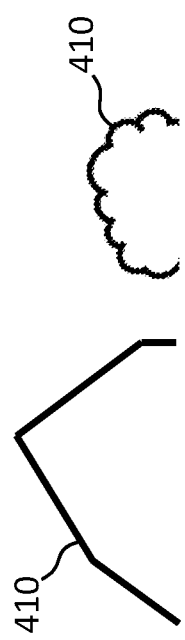
FIG. 3d shows the highlighted edges highlighted of FIG. 3c.

FIG. 3a shows a similar image scene 400 captured by the car 104 wherein the local environment is foggy. The previous distal objects 302 that were shown only above the horizon 10 in FIG. 2a are now obscured by fog, however nearer objects 404, 406 are not obscured by the fog. Similarly to FIG. 2b, FIG. 3b shows a selection box 408 being applied to the image scene 400. An edge detection algorithm is applied to the selected portion resulting in the detected edges shown in FIG. 3c. FIG. 3d shows a similar view to FIG. 2d except that the number of continuous edges is only two. These two edges were as a result of nearby objects 406 having portions extending above the horizon 10 in the image scene 400.

If a threshold value was pre-set to four continuous edges and any scene equal to or under that value caused the output of a control signal, then: A) the scene 300 of FIG. 2a would not trigger the output of the control signal, but B) the scene 400 of FIG. 3a would trigger the output of the control signal. This control signal could, for example turn the fog lights on.

In the above example shown in FIGS. 2a-d and 3a-d, the same sized and shaped selection boxes 308, 408 are used. Alternatively the image analyser may variably select different portions of each successive captured image. This may be because the car is going up or down a hill or changing its orientation relative to the horizon level. The horizon level may therefore change in subsequent images where the car is going up the hill as opposed to down the hill.

The image analyser 2 may determine that the car 104 is being driven forwards up or down a hill by any suitable means. In one example this may be facilitated by having one or more accelerometers or inclinometers accommodated within, or otherwise about, the car 104 that provide electronic signals from which the image analyser can determine an orientation of the car 104 with respect to the horizon. Additionally or alternatively, the front-to-back vehicle 4 orientation may be determined using location data to determine a current position and direction of motion of the vehicle 4 and comparing this data to topography data to determine the inclination of the vehicle 4. The location data may be determined using a Global Positioning System wherein the current position is determined from one or more GPS signals and the current direction of motion is determined using a plurality of time spaced GPS signals. A GPS communication apparatus may be housed within the vehicle 4 and be in communication with the image analyser. The GPS communication apparatus may be integral to the vehicle 4 or may be a separate device held within or on the vehicle. The topography data may be a map or other form of geolocation data. This topography data may be preloaded into a memory means within and/or in communication with, the image analyser 2.

If, from the location data, the image analyser 2 determines that the car 104 is going uphill, the image analyser 2 may enlarge and/or move the selection area 308, 408 of the image scene to encompass a greater amount of the lower portions of the image file, representing the horizon being lower in the image scene 300, 400. Likewise if, from the location data, the image analyser 2 determines that the car 104 is going down a hill, the image analyser may reduce and/or move the selection of the image scene to encompass a lesser amount of the lower portions of the image file, representing the horizon being higher in the image scene 300, 400.

In addition or in the alternative to the above examples, the same location data may be used to control an orientation of the camera 106. The camera 106 may be mounted to the car 104 such that the angle at which the camera 106 points to the area in front of the car 104 may be adjustably controlled. Similarly to the above example where the car 104 is going down a hill, the data may be used to alter the tilt of the camera 106 to compensate for the upward movement of the horizon in an image scene if the camera 106 were to have stayed in the same orientation with respect to the car 104.

Additionally or alternatively, the image analyser 2 may use one or more image processing techniques to identify and remove certain objects from the image before performing edge detection. This may be required to remove nearby objects that would not be obscured by fog or smog but have a significant portion of their shape within the selection of the image for edge detection. Such objects could be other large nearby vehicles on the road such as buses or lorries.

The removal of nearby objects from an image scene may be accomplished in any suitable way including, but not limited to: determining an first object in a first image, determining an second object in a second image, the first and second image captured at different times; comparing the first and second objects to determine that both are related to the same real physical object, determining parallax data using the comparison, determining a position of the real object using the parallax data, removing any of the first or second objects from the respective first and second images based on the determined position.

Figure 4A:
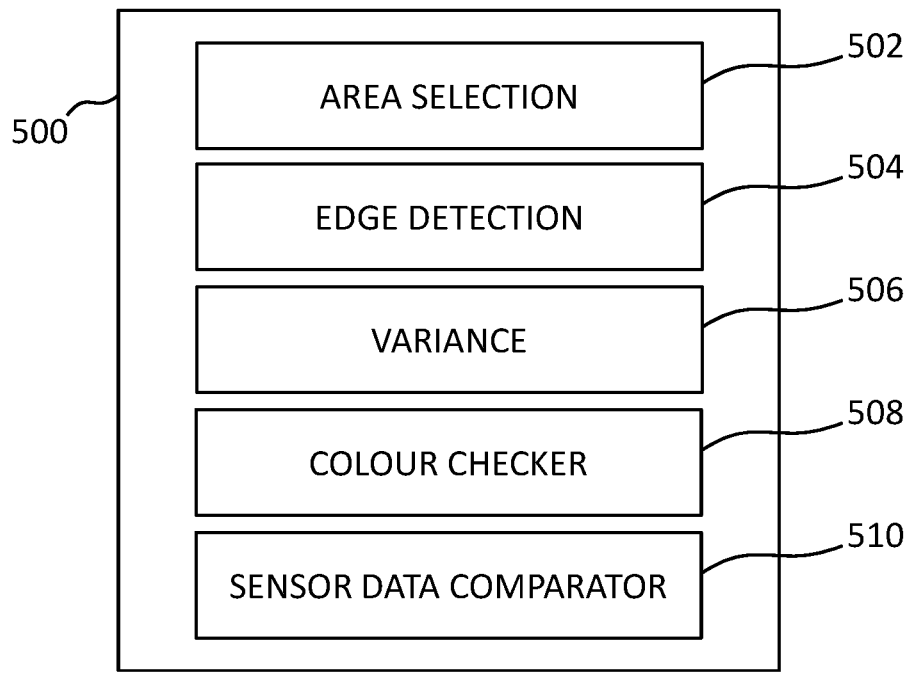
FIG. 4a shows software modules used for an embodiment.

FIG. 4a shows a block diagram example of a pollution detector system. The system 500 may utilise any one or more of the methods described herein and be operated by the image analyser 2 described herein. The system 500 comprises a number of sub-modules including, but not limited to, an area selection module 502 which selects an area of the input image to apply the edge detection algorithm 2, as described above. An edge detection module 504 is provided as discussed above. A variance module 506 is discussed as discussed herein. A colour checker module 508 is shown as discussed herein. A sensor data comparator module 510 is also included as described herein. The system 500 may include more or fewer modules than shown in FIG. 4a, for example the system may not include the colour checker, the system may not include the sensor data comparator module, the system 500 may not include the variance module 506.

Figure 4B:
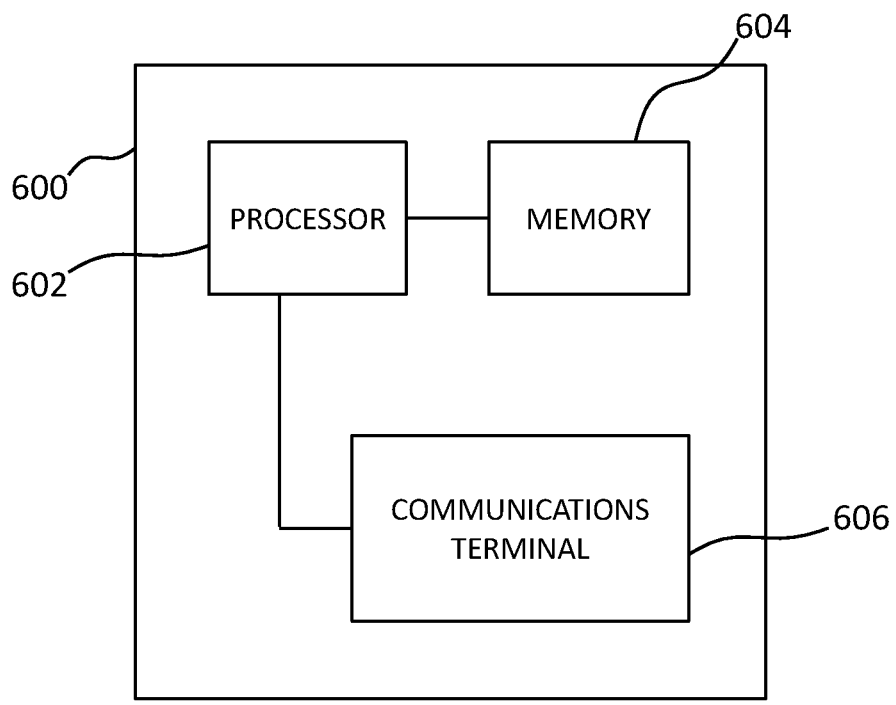
FIG. 4b shows hardware components used for an embodiment.

FIG. 4b shows an example of an image analyser 600 that may be used with the methods and systems described herein. The image analyser 600 has an electronic processor 602, an electronic memory 604 operatively coupled to the processor 602. The image analyser 600 further comprises a communications terminal 606 including at least a receiver to receive the image data from the image capture device. The memory 604 may store any one or more of the algorithms or computer program processes shown in any of the modules of FIG. 4a.

The edge detection module may employ one or more edge detection algorithms that detect the outline of one or more objects in the image scene. The outlines may be discontinuities in depth, surface orientation, changes in material properties or light variations. In general, the edge may be a set of collected pixels that lies on the boundary between two regions that differ in greyscale value.

The type of edges detected may be any particular edge, including but not limited to, a step edge, a ramp edge, a spike edge, or a roof edge. Each edge typically comprises a continuous line ending in edge points.

The edge detection process may comprise three sequential steps of:
a) Filtering; whereby the image is smoothed to suppress noise without affecting the edges within the seam. The process of filtering may also be used to enhance the quality of the edges in the image seam. An example of filter use may be a Gaussian filter.
b) Differentiation. This next step distinguishes edge pixels from other pixels. In this particular step the non-zero difference between two neighbouring pixels indicates the presence of an edge point. The algorithm or the user operating the algorithm may set a particular threshold whereby if the first derivative of the edge point is greater than the threshold then it is defined as an edge point. Additionally the edge point may also be defined when the second derivative of the edge point has a sign change indicating a zero crossing.
c) Localisation. This step determines the exact location of the edge and optionally involved thinning and linking steps. The edge linking step may be used to ensure that brakes in the edge of a scene due to image anomalies are ignored for the purposes of creating a single edge in the output of the edge detection algorithm.

The edge detection algorithm may include, but not be limited to, any one or more of the following; a first order edge detection operator, including any of a Roberts operator, a Prewitt operator, a Sobel operator, a Canny operator: template matching masks may be used such as Kirsch mask, Robinson Compass masks, Frei-Chen masks; second order derivative filters may be used. First order edge detection operators have the advantage that they work on each frame rather than working on an edge over time. This means they are relatively simple algorithms to run and hence are fast at producing an output.

As described above, the edge detection module may utilise edge linking algorithms to ensure that long edges in the image scene are conveyed in the edge detection output such edge linking algorithms may include edge relaxation and graph theoretic algorithms.

The variance of the image data may be calculated within the whole or a portion of the image. This may be determined using any suitable algorithm that calculates the variance of a set of pixel image data. The variance determines how far the spread of pixel intensity values are spread out from the mean value. This may be calculated for the image portion selected for edge detection. The pixel intensity value is a vale indicating the brightness of the pixel. If a grayscale image is used, then the pixel intensity value may vary from 0 to another maximum non zero integer number. The pixel values may be integers that range from 0 to 255.

The variance can be used in conjunction with the number of detected edges to determine whether to output the control signal. The variance value may be used in any suitable way, including but not limited to any one or more of the following: a) used to create a scaling factor to scale the number edges found in a scene before the edge number is compared to the threshold; b) used to add or subtract to the number of edges found in the scene before the edge number is compared to the threshold; c) used as a comparison value after the edge detection output is compared to the threshold, for example if the threshold comparison outputs that the number of edges is less than the threshold, the number of edges is compared to the variance value using a set of criteria.

It has been found, by the inventor/s, that high pollution levels decrease the variance in the image. Therefore by monitoring the variance the image analyser and method described herein can provide another means to determine a foggy scene that may be used in conjunction with the detection of edges.

Other data may be used in the method to determine whether to output a control signal and what control signal to output. This data may be obtained from any suitable source including data communicated to the processor from within or outside of the vehicle. This could be, for example, data from a weather report. The report data may be directly used by the processor or may need to be formatted or have data extracted from the report before being able to be used by the processor to determine the output of the control signal. For example a speech detection algorithm could monitor for certain words in a broadcast weather report played in the car and then use the extracted word to base the output of the control signal, e.g. detection of the word 'smog' or 'pollution' may be used to shut off the air vents.

Other data may be obtained from one or more sensors accommodated about the vehicle. Examples of sensors are a humidity sensor and/or a temperature sensor. Data from one or both of these sensors may be used to determine a control signal. In one example, the humidity and temperature data are used together to determine whether the local environment is 'foggy' or 'smoggy'. A separate threshold or comparator value may be used to compare each data value and if certain conditions are met, then the control signal is generated/modified accordingly. For example, fog is usually detected when the humidity is greater than 90% and the temperature is approximately 2.5 degrees. Therefore the method may determine that sensor readings outside of these ranges indicate smog pollution, hence a control signal is generated to shut the air vents of the vehicle. Other temperature and humidity ranges may be used.

Another input to the method to determine whether to output a control signal is the presence of certain colours within the image or the portion of the image selected for edge detection. An example of this is the colour checker module 508 in FIG. 4a. If a car is being driven in an environment, like the desert, where there are no objects nearby or on the horizon and there are no clouds in the sky, then the edge detection algorithm may detect very few or no edges. This in turn may nominally lead to a control signal to be output such as turning the fog lights on. This may be undesirable in such circumstances because the visibility is clear. The method may therefore determine whether there are a suitable number of coloured pixels within the image data. If a number of image pixels in the image are determined to be blue, this would indicate that the lack of edges is simply due to a clear but featureless environment. As such the image analyser would override the output of the control signal.

The application of the colour checker module may be determined upon other factors such as outside ambient light levels or time data. Data associated with the local time may be input into the image analyser. If the time indicates daylight hours then the output from the colour checker module may be used to determine the control signal. However, if the time indicates twilight or night time hours then the output from the colour checker module may be disregarded in the determination of the control signal. Similar determinations may be made additionally or alternatively using one or more light sensors local to the vehicle. If the light sensor detects a level of ambient light outside of the vehicle above a threshold value, then the decision is made, by the image analyser, to use the output of the colour checker module because this light level indicates daylight hours. However, if the level of ambient light outside of the vehicle below a threshold value, then the decision is made, by the image analyser, to not use the output of the colour checker module because this light level indicates twilight or night time hours.

Figure 5A:
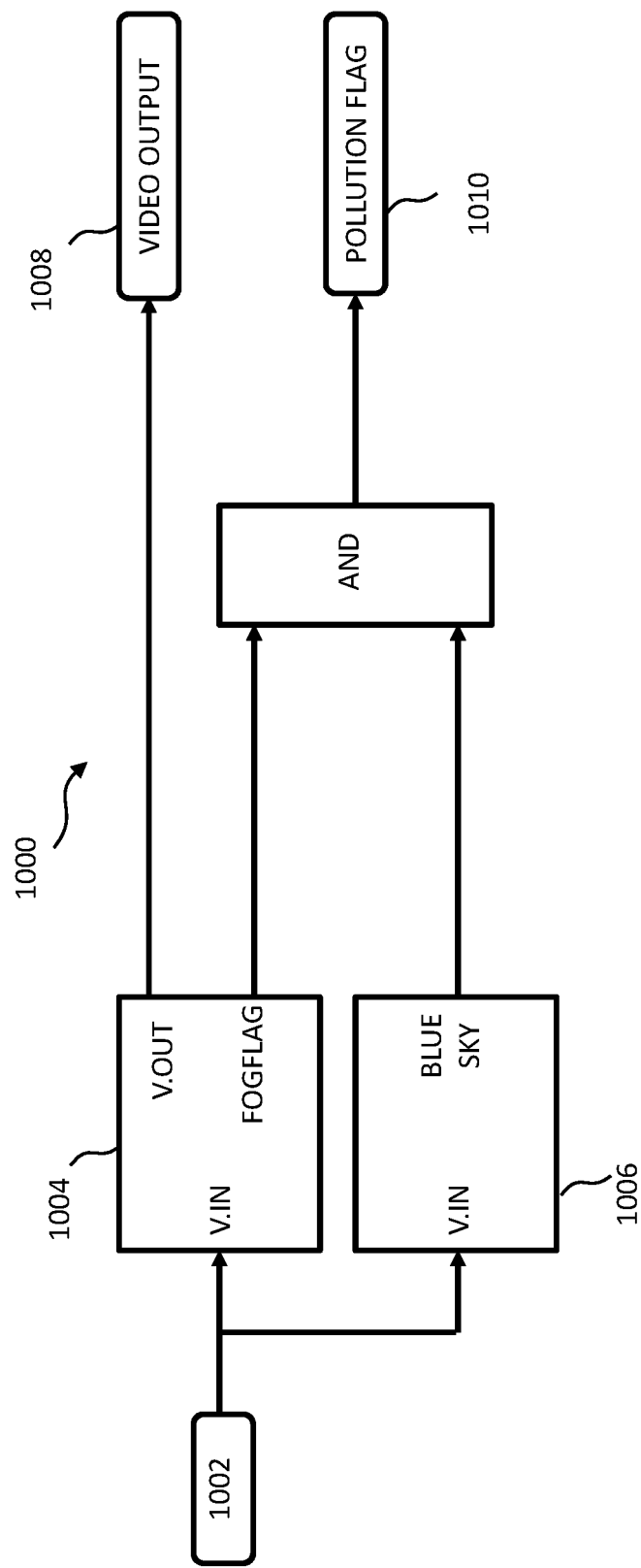
FIGS. 5a-5c show block diagrams of the operation of software modules according to an embodiment.
Figure 5B:
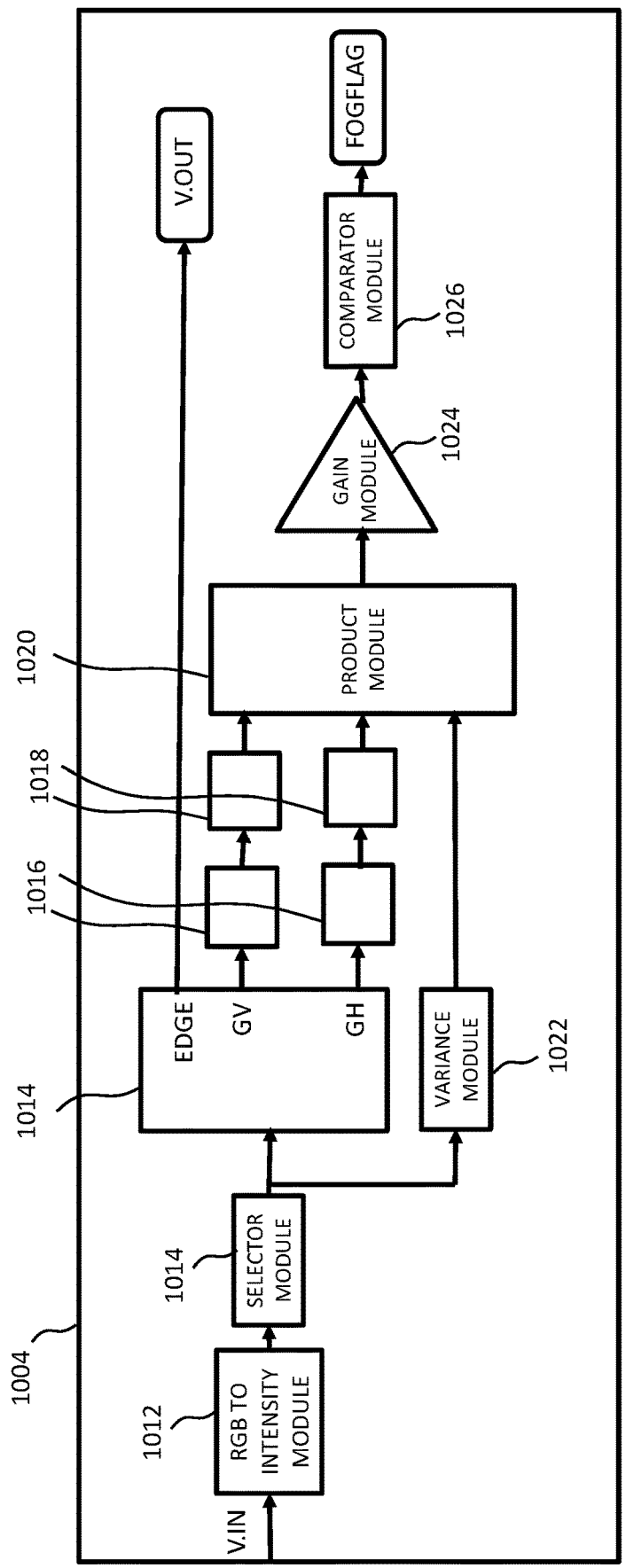
Figure 5C:
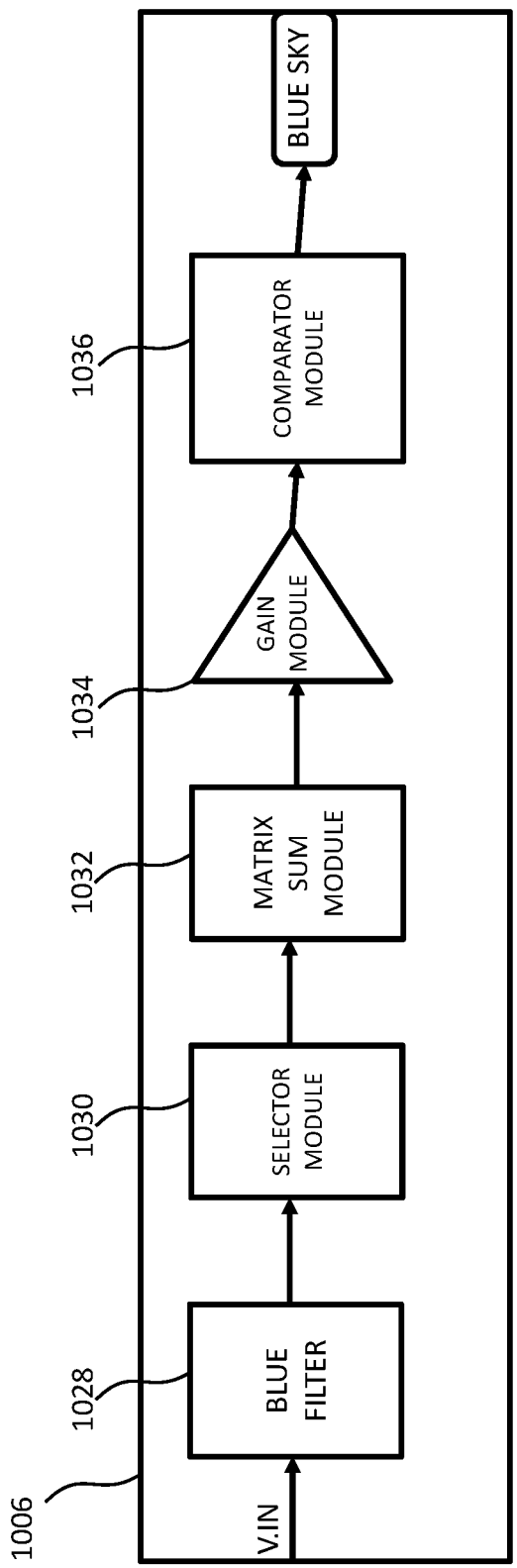

FIGS. 5a to 5c show an example of the method according to the present invention. This example method is a computer implemented method executed by running executable program code on an image analyser such as a vehicle's on board computer. The image analyser may be referred to as a system throughout this example.

The method starts at block 1002 on FIG. 5a. Block 1002 represents image data input from an image capture means such as, but not limited to, a forward facing video camera. This image data is then split and input into the video input of the fog detector module 1004 and the blue sky detector module 1006. The blue sky detector module 1006 is an example of the colour checker module 508 as shown in FIG. 4a and is further discussed below with reference to FIG. 5c. The fog detector module 1004 is an example of the edge detection module 504 as shown in FIG. 4a and is further discussed below with reference to FIG. 5b.

The output of the fog detector module 1004 comprises two outputs. The first output being a video output 1008 of the system which may, in turn, be used as the image analyser for any of a number of purposes including providing a video signal to output on a screen that is visible to the driver of the vehicle.

The second output of the fog detector module 1004 is a fog flag output. This output is then input into a logical 'AND' operator. Similarly, the output of the blue sky detector module 1006 is also input into the 'AND' comparator logic module.

The output of the 'AND' comparator logic module is an electronic signal that acts as a pollution flag 1010 to the image analyser. This pollution flag signal 1010 is used by the image analyser to generate the control signal used to control an operation of a vehicle such as operating the fog lights and/or shutting the air vents and/or any other vehicle operation described elsewhere herein. Alternatively, the pollution flag signal 1010 may form at least part of the control signal itself.

FIG. 5b shows an exploded detailed view of the fog detector module 1004. In FIG. 5b the video input 'AND' is shown on the left hand side being input into a RGB to intensity module 1012 which provides colour space conversion to a grey scale image. Conversion to a grey scale image is used to make the edge detection process simpler. The output of module 1012 is input into a selector module 1014 which selects a portion of the video image in similar fashion to the area selection module 502 in FIG. 4a. In this example the selector module selects the top half of the image for sending onto the next processing block 1014. The output of the selector module 1014 then goes into a Sobel edge detection module 1014 and a variance module 1022. The Sobel edge detection module 1014 performs an edge detection analysis upon the grey scale selected video data. Three types of output signals are output from this module. The first output is an edge output which is the video output of the fog detector module 1004. The other two outputs are the counts of the number of vertical and horizontal edges of the selected grey scale portion of the image scene. Each of these outputs GH, GV are input into separate corresponding modules 1016 which take the absolute values of these outputs. The modules 1016 are required in this particular example because the Sobel edge detector operator may output negative values, however the system is required to count the total number of edges; therefore all of the output edges must be put into a positive value. The output of each module 1016 goes into a corresponding matrix sum module 1018 whereby each of the respective horizontal and vertical edges are summed for a particular scene. The output of each of the matrix sum modules 1018 is input into product module 1020.

Coming back to the output of the selector module 1014, the output signal is split so that a portion of the signal is sent to variance module 1022. The variance module acts in a similar way to the variance module 506 of FIG. 4a and described elsewhere herein.

The product module 1020 calculates the product of the summed absolute vertical edges, summed absolute horizontal edges and the output of a variance operator module 1022. The output from module 1022 is then input into a gain module 1024 which multiplies the output value of module 1022 by a gain value. The gain value is chosen so that the value input into the next comparator module 1026 is at an appropriate level or number. In this example, the gain value is 0.01 however other values may be used. It may be that the gain module 1024 is not used in other examples. The output from the gain module 1024 is input into the comparator module 1026 which compares this value to a pre-defined constant, for example the number 100. If the value is smaller than, or equal to, the constant, then a FOGFLAG signal is output as shown in FIG. 5a. The outputting of this signal represents a lack of detail in the selected portion of the image scene which in turn may represent a foggy local environment. If the value is greater than the constant then this indicates that a sufficient level of detail is in the selected portion of the scene to assume that the local environment is not foggy. In this 'non-foggy' scenario a FOGFLAG signal is not output. Alternative versions of this example may use different criteria to compare the constant, and/or, different constants. Constants may be predefined or updated as the method is running. The FOGFLAG output may be any value to be input into the AND module, for example, the flag may be a 1 or a 0 value where 1 indicates the lack of detail in the selected portion of the image, hence the possibility of fog.

FIG. 5c shows an exploded detailed view of the blue sky detector module 1006. Similarly to FIG. 5b, the video input 'V.IN' is shown on the left hand side being input into a blue filter 1028 which outputs just the blue pixels from the input image signal. This blue filtered output is then input into a selector module 1030 which performs a similar operation to module 1014 of FIG. 5b to select the portion of the image above the horizon. The selected portion of the blue pixels in the image is then input into a matrix sum module 1032 which sums the number of blue pixels in the image. The output from this module is then passed through a gain module 1034 similar to that of module 1024 of FIG. 5b and then into another comparator module 1036 which compares this gain modified value to a predefined threshold. The BLUE SKY output may be any value to be input into the AND module, for example, the flag may be a 1 or a 0 value where 1 indicates the lack of blue pixels in the selected portion of the image.

In this example, if the value input into comparator module 1036 is smaller than or equal to the threshold, then this indicates a lack of blue pixels above the horizon therefore the image pixels represent other content in the scene apart from blue sky. In this case the output of the comparator module 1036 would be a 1.

Given a BLUE SKY output of a 1, the output 1010 of the system may be one of two options.

Firstly, when BLUE SKY output of a 1 is input into the AND module of FIG. 5a together with a corresponding FOGFLAG output of a 1, the image analyser would output a corresponding signal indicating the possible presence of fog. This output signal may be any output signal, for example a 1.

Secondly, when BLUE SKY output of a 1 is input into the AND module of FIG. 5a together with a corresponding FOGFLAG output of a 0, the image analyser would output a corresponding signal indicating that the local environment was devoid of fog. This output signal may be any output signal, for example a 0.

If the value input into comparator module 1036 is larger than or equal to the threshold, then this indicates a sufficient number of blue pixels above the horizon, therefore the image pixels may represent a scene largely dominated by blue sky. In this case the output of the comparator module 1036 would be a 0.

In each case of the FOGFLAG output of module 1004 being a 0 or 1 output, the output from the AND gate would always be a 0 because in each case it would be assumed that the visibility is clear enough to see the blue sky in front of the vehicle.

This example shown in FIGS. 5a-5c and described above may be adapted in any suitable way from other examples and features described herein.

The image analyser may comprise one or more processing devices. Any of the processing devices described herein may comprise one or more electronic devices. An electronic device can be, e.g., a computer, e.g., desktop computer, laptop computer, notebook computer, minicomputer, mainframe, multiprocessor system, network computer, e-reader, netbook computer, or tablet. The electronic device can be a smartphone or other mobile electronic device.

The computer can comprise an operating system. The operating system can be a real-time, multi-user, single-user, multi-tasking, single tasking, distributed, or embedded. The operating system can be any of, but not limited to, Android®, iOS®, Linux®, a Mac operating system and a version of Microsoft Windows®. The systems and methods described herein can be implemented in or upon computer systems. Equally, the processing device may be part of a computer system.

Computer systems can include various combinations of a central processor or other processing device, an internal communication bus, various types of memory or storage media for code and data storage, and one or more network interface cards or ports for communication purposes. The devices, systems, and methods described herein may include or be implemented in software code, which may run on such computer systems or other systems. For example, the software code can be executable by a computer system, for example, that functions as the storage server or proxy server, and/or that functions as a user's terminal device. During operation the code can be stored within the computer system. At other times, the code can be stored at other locations and/or transmitted for loading into the appropriate computer system. Execution of the code by a processor of the computer system can enable the computer system to implement the methods and systems described herein.

The computer system, electronic device, or server can also include a central processing unit, in the form of one or more processors, for executing program instructions. The computer system, electronic device, or server can include an internal communication bus, program storage and data storage for various data files to be processed and/or communicated. The computer system, electronic device, or server can include various hardware elements, operating systems and programming languages. The electronic device, server or computing functions can be implemented in various distributed fashions, such as on a number of similar or other platforms.

The devices may comprise various communication capabilities to facilitate communications between different devices. These may include wired communications and/or wireless communications. Examples of wireless communications include, but are not limited to, radio frequency transmission, infrared transmission, or other communication technology. The hardware described herein can include transmitters and receivers for radio and/or other communication technology and/or interfaces to couple to and communicate with communication networks.

An electronic device can communicate with other electronic devices, for example, over a network. An electronic device can communicate with an external device using a variety of communication protocols. A set of standardized rules, referred to as a protocol, can be used utilized to enable electronic devices to communicate. A network can be a small system that is physically connected by cables or via wireless communication. An electronic device can be a part of several separate networks that are connected together to form a larger network. Other types of networks of which an electronic device can be a part of include the internet, telecom networks, intranets, extranets, wireless networks, and other networks over which electronic, digital and/or analogue data can be communicated.

The methods and steps performed by components described herein can be implemented in computer software that can be stored in the computer systems or electronic devices including a plurality of computer systems and servers. These can be coupled over computer networks including the internet. The methods and steps performed by components described herein can be implemented in resources including computer software such as computer executable code embodied in a computer readable medium, or in electrical circuitry, or in combinations of computer software and electronic circuitry. The computer-readable medium can be non-transitory. Non-transitory computer-readable media can comprise all computer-readable media, with the sole exception being a transitory, propagating signal. Computer readable media can be configured to include data or computer executable instructions for manipulating data. The computer executable instructions can include data structures, objects, programs, routines, or other program modules that can be accessed by a processing system Computer-readable media may include, but are not limited to, non-volatile storage media in various forms, volatile media and carrier waves that can be used to transfer such formatted data and/or instructions through wireless, optical, or wired signalling media, transmission media or any combination thereof.

The terms processing, computing, calculating, determining, or the like, can refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices. Users can be individuals as well as corporations and other legal entities. Furthermore, the processes presented herein are not inherently related to any particular computer, processing device, article or other apparatus. An example of a structure for a variety of these systems will appear from the description herein. Embodiments are not described with reference to any particular processor, programming language, machine code, etc. A variety of programming languages, machine codes, etc. can be used to implement the teachings as described herein.

An electronic device can be in communication with one or more servers. The one or more servers can be an application server, database server, a catalog server, a communication server, an access server, a link server, a data server, a staging server, a database server, a member server, a fax server, a game server, a pedestal server, a micro server, a name server, a remote access server, a live access server, a network access server, a home server, a proxy server, a media server, a nym server, network server, a sound server, file server, mail server, print server, a standalone server, or a web server. A server can be a computer.

One or more databases can be used to store information from an electronic device. The databases can be organized using data structures included in one or more memories or storage devices.

The image capture means may be any suitable apparatus or device, for example a digital camera, a digital video camera. The image capture means may be mounted on or in the vehicle, be detachable and removable from the vehicle or be integral to the vehicle.

Many modifications may be made to the above examples without departing from the scope of the present invention as defined in the accompanying claims.

The invention claimed is:

1. A method for outputting a control signal, the method comprising:
   receiving image data associated with an image captured by an image capture means;
   determining a visibility condition about a vehicle by performing an analysis of at least a portion of the image data to determine one or more edges representing outlines of objects or object features in the image, summing the number of determined edges and comparing the number of determined edges with a threshold;
   performing an analysis of a colour value of a plurality of pixels in at least a portion of the image data, wherein performing the analysis of the colour value of the pixels in the plurality of pixels comprises:
      determining the number of pixels having a colour value within a colour value range; and
      comparing the determined number of pixels to a threshold; and
   outputting a control signal based on the analysis of the at least a portion of the image data and the analysis of the colour value, the control signal for controlling an operation of a vehicle system of the vehicle.

2. The method as claimed in claim 1, further comprising selecting a portion of the image data for the analysis of the at least a portion of the image data, the selected portion being associated with a portion of the image.

3. The method as claimed in claim 1, wherein selecting the portion of the image data comprises selecting a region having at least one lateral border running across and within the image.

4. The method as claimed in claim 1, wherein:
   performing the analysis of the at least a portion of the image data comprises summing the number of determined edges; and
   outputting the control signal is further based on the summed number of edges.

5. The method as claimed in claim 1, wherein performing the analysis of the at least a portion of the image data comprises applying an edge detection algorithm to the image data.

6. The method as claimed in claim 1, further comprising determining a variance of pixel intensity values for a plurality of pixels for at least a portion of the image data, wherein outputting the control signal is further based on the determined variance.

7. The method as claimed in claim 1, wherein the control signal is configured to control the operation of at least one selected from the group consisting of: a vehicle lighting system, an infotainment system, and a vehicle ventilation system.

8. A method as claimed in claim 1, further comprising:
   receiving a signal associated with environmental data;

wherein outputting the control signal is further based on the environmental data.

9. A method as claimed in claim 8, wherein the environmental data is associated with a plurality of environmental conditions, and wherein outputting the control signal is further based on at least two of the plurality of environmental conditions.

10. A non-transitory computer readable medium comprising program code which, when executed by a processing means, is configured to cause the processing means to perform the method as claimed in claim 1.

11. An image analyser for outputting a control signal, wherein the image analyser is configured to:
- receive image data associated with an image captured by an image capture means;
- determine a visibility condition about a vehicle by performing an analysis of at least a portion of the image data to determine one or more edges representing outlines of objects or object features in the image, summing the number of determined edges and comparing the number of determined edges with a threshold;
- perform an analysis of a colour value of a plurality of pixels in at least a portion of the image data by:
  - determining the number of pixels having a colour value within a colour value range; and
  - comparing the determined number of pixels to a threshold; and
- output a control signal based on the analysis of the at least a portion of the image data and the analysis of the colour value, the control signal for controlling an operation of a vehicle system of the vehicle.

12. The image analyser as claimed in claim 11, wherein the image analyser is further configured to select a portion of the image data for the analysis of the at least a portion of the image data, wherein the selected portion is associated with a portion of the image.

13. The image analyser as claimed in claim 11, wherein selecting the portion of the image data comprises selecting a region having at least one lateral border running across and within the image.

14. The image analyser as claimed in claim 11, wherein analysing the image data comprises applying an edge detection algorithm to the image data.

15. The image analyser as claimed in claim 11 wherein the image analyser is further configured to:
- determine the variance of pixel intensity value for a plurality of pixels for at least a portion of the image data;
- wherein the control signal is output further based on the determined variance.

16. The image analyser as claimed in claim 11, wherein the control signal is configured to control the operation of at least one selected from the group consisting of: a vehicle lighting system, an infotainment system, and a vehicle ventilation system.

17. A vehicle comprising an image analyser as claimed in claim 11.

18. A vehicle as claimed in claim 17, the vehicle further comprising the image capture means.

* * * * *